United States Patent [19]

Ganzhorn

[11] 4,312,571

[45] Jan. 26, 1982

[54] METHOD FOR BONDING TO POLYMERIC CLAD OPTICAL WAVEGUIDES

[75] Inventor: Harry E. Ganzhorn, Stuttgart, Fed. Rep. of Germany

[73] Assignee: Raychem Corporation, Menlo Park, Calif.

[21] Appl. No.: 90,111

[22] Filed: Nov. 1, 1979

[51] Int. Cl.³ .................................................. G02B 7/26
[52] U.S. Cl. ........................................ 350/320; 134/2; 134/19; 134/38; 350/96.20
[58] Field of Search ............... 350/96.20, 96.21, 96.30, 350/96.31, 96.34, 320; 65/3 C, 4 R, 4 B, 36, 60 B; 156/158; 134/1, 2, 4, 5, 19, 42, 38

[56] References Cited

U.S. PATENT DOCUMENTS

| | | | |
|---|---|---|---|
| 3,788,827 | 1/1974 | De Luca | 65/30 |
| 4,028,080 | 6/1977 | Di Vita et al. | 65/2 |
| 4,057,438 | 11/1977 | Mainord | 134/2 |
| 4,113,346 | 9/1978 | Jackson et al. | 350/96.20 |
| 4,134,641 | 1/1979 | Kao et al. | 350/96.21 |
| 4,148,554 | 4/1979 | Magnusson et al. | 350/96.21 |
| 4,186,999 | 2/1980 | Harwood et al. | 350/96.21 |
| 4,196,965 | 4/1980 | Matsuno | 350/96.21 |
| 4,198,119 | 4/1980 | Uberbacher | 350/96.20 |
| 4,220,480 | 9/1980 | Dwan | 134/5 |

FOREIGN PATENT DOCUMENTS

| | | | |
|---|---|---|---|
| 2721347 | 11/1978 | Fed. Rep. of Germany | 350/96.20 |
| 54-102134 | 8/1979 | Japan | 350/96.21 |
| 1448975 | 9/1976 | United Kingdom | 350/96.21 |
| 2003294 | 3/1979 | United Kingdom | 350/96.21 |

*Primary Examiner*—John D. Lee
*Attorney, Agent, or Firm*—Lyon & Lyon

[57] ABSTRACT

A method of preparing a polymeric clad fiber waveguide for termination is disclosed. The method includes the steps of removing cladding to expose a portion of the fiber core, and then heating the exposed portion to render the surface of the fiber core suitable for bonding to a termination sleeve.

18 Claims, No Drawings

METHOD FOR BONDING TO POLYMERIC CLAD OPTICAL WAVEGUIDES

BACKGROUND

The present invention is directed to a method for bonding to the glass core of polymeric clad glass fiber waveguides and in particular, to silicone clad glass fiber waveguides.

Glass optical fibers used for fiber optics applications typically are protected by a covering or cladding, which can be a polymeric material. For example, co-pending and co-assigned U.S. patent application Ser. No. 964,506 filed on Nov. 29, 1978 by Ellis et al, which is incorporated herein by this reference, describes silicone clad glass fiber waveguides.

Methods for terminating such waveguides are required. Bonding to some cladding materials such as silicone claddings is not functional, because the cladding has little strength, and therefore, maintaining the required critical alignment between fiber ends and interconnecting devices is not possible if a bond is made directly to the cladding.

A method for terminating such silicone clad glass fiber waveguides is described in the aforementioned patent application Ser. No. 964,506. The method involves replacing a portion of the low strength silicone cladding with a harder and higher strength termination sleeve. This involves stripping a portion of the silicone cladding from the glass fiber core and then bonding the termination sleeve to the exposed core. The termination sleeve has a sufficiently low refractive index to contain the transmitted light within the fiber core.

It has been noted that when this method is used, the bond formed between the termination sleeve and the glass core can be inadequate. The bond strength can be substantially less than the strength of the glass fiber core itself, and in use, the glass core can accidentally be pulled out of a termination sleeve. Attempts to alleviate this problem by cleaning the outer surface of the glass fiber core with solvent before bonding have been only partially successful.

It is believed that the problem results from a silicone residue being left on the fiber core. The silicone residue that remains on the glass surface even after chemical treatment of the surface is difficult to wet and prevents good adhesion. Even if a bond to the silicone is formed, the bond strength is dependent on the strength of the silicone to glass bond, which is very low. In view of this problem, there is a need for a surface preparation method for bonding a termination sleeve to a polymeric clad glass fiber waveguide.

SUMMARY

The present invention is directed to such a method. According to the method, a portion of the polymeric cladding on the fiber core is removed to expose a surface portion of the core, the exposed surface portion of the core having a polymeric residue thereon. Preferably the exposed surface portion of the fiber core is pre-cleaned with an appropriate solvent. Alternatively, and more preferably, the exposed surface portion of the fiber core is pre-cleaned by heating the residue coated surface to a temperature in the order of about 315° C. (600° F.) for an exposure time in the order of about ten seconds thereby causing the residue to become somewhat brittle. After allowing the fiber to cool to room temperature, most of the now embrittled residue is mechanically stripped away with a cloth, fingernails or the like. Subsequently the exposed portion of the fiber core is heated to a sufficiently high temperature for a sufficient time so that a bond can be formed between the exposed fiber core and a termination sleeve substantially as strong as the bond that can be formed with a termination sleeve and a similar fiber core that has never had a polymeric cladding. Temperatures in the order of about 760° C. (1400° F.), with exposure times in the order of about ten seconds, have been found to be sufficient for a silicone clad glass fiber waveguide. Preferably, after allowing the fiber to cool, the surface of the exposed fiber core is wiped with an appropriate solvent to remove any loose particles of oxidized polymer residue.

These and other features of the present invention will become better understood with reference to the following description and appended claims.

DESCRIPTION

The present invention provides a method for preparing a polymeric clad fiber waveguide for termination. Although the present invention will be described in considerable detail with reference to silicone clad quartz fibers, the invention is not limited to silicone cladding or quartz fibers. The method described can be used with other types of fiber cores, and other types of polymeric optical cladding or protective coatings which can interfere with bonding a termination sleeve to the fiber. The invention is limited to use with fiber cores that are not adversely affected by the heat required for treating the residue of cladding left on the fiber after a normal stripping operation.

In the first step in the method of this invention, a portion of the cladding on the fiber core is removed. This can be done by conventional stripping techniques such as mechanical or heat stripping. The removal is never complete, and a residue of the cladding, whether it be silicone or other polymer cladding, is generally left on the exposed surface of the fiber core.

Although the heating step can be used without a pre-cleaning step, preferably the next step is to remove a portion of the residue with either a lower temperature heating step (employed to render portions of the residue brittle and more susceptible to being flaked off) or with an appropriate solvent. Any solvent that is effective for at least softening, and preferably dissolving, the residue can be used, as long as the solvent does not damage the fiber core. Solvents which can be used for silicone clad quartz fiber include: (1) tetramethyl guanidine; (2) a stripping solution available under the tradename J-100 from Indust-Ri-Chem Laboratory of Richardson, Texas; and (3) an aqueous solution of hydrofluoric acid. The exposed surface portion of the fiber core is more preferably pre-cleaned by heating the residue coated surface to a sufficiently high temperature for a sufficient time to cause the residue to become somewhat brittle. After allowing the fiber to cool to about room temperature, most of the now embrittled residue is mechanically stripped away with a cloth, fingernails or the like. For silicone clad waveguide having a fused quartz fiber core about 200 microns in diameter, a temperature in the order of about 315° C. (600° F.) for an exposure time in the order of about ten seconds has been successfully employed to render portions of the residue brittle and more susceptible to being flaked off.

After a portion of the residue is removed with either lo-heat or solvent, at least part of the exposed surface portion of the fiber core is exposed to a sufficiently high temperature for a sufficient time so that a bond of desired strength can be formed between the fiber core and a termination sleeve. The temperature required and the amount of time required depend upon such parameters as the type of cladding, the type of fiber core, the amount of residue left, and the materials used in the termination sleeve. Preferably, after allowing the fiber to cool, the surface of the exposed fiber core is wiped with an appropriate solvent to remove any loose particles of oxidized polymer residue. Isopropyl alcohol is an example of a solvent suitable for wiping quartz cores previously clad with silicone polymers. To determine if adequate heat treatment has taken place, all that is necessary is to make a termination with a treated fiber core, and then pull on the termination with a device such as an Instron tester until failure of the bond or the fiber core itself. The termination can be made with a two sleeve device such as described in the aforementioned application Ser. No. 964,506. Criteria have been developed to determine if the resulting bond is sufficiently strong. One criterion is whether or not the bond formed is substantially as strong as the bond that can be formed with a fiber core that has never been clad. If this is the result, the heat treatment is deemed successful. Another criterion is to determine if the bond that is formed is stronger than the waveguide itself. If this is the result, then the heat treatment is deemed successful.

For 200 micron diameter quartz fibers clad with polydimethyl siloxane, it has been found that pre-heating to 315° C. (600° F.) for ten seconds to aid in the removal of the silicone residue and subsequently heating the exposed fiber core at 760° C. (1400° F.) for ten seconds, allows a satisfactory bond to be formed between the quartz core and a termination sleeve.

Heating has been successfully done either with a hydrogen gas flame or with a radiant oven.

When heating, it is desirable to protect the cladding that is not removed from the fiber core from damage. This can be effected with an insulating shield, such as a shield made from asbestos or other insulating material, or by wrapping the cladding with an insulating material, such as asbestos tape. When a hydrogen flame is used, it is possible to localize the flame so that protection for the unremoved cladding is not necessary.

The effectiveness of the heat treatment may be the result of removing the silicone. However, it is believed that the heat treatment is effective because the silicone residue is oxidized, thereby increasing the polarity and cross-linking of the residue. This causes the silicone to be easier to bond to and stronger. Oxidation can result in the silicone being completely oxidized to silicon dioxide, which would have the same high energy surface as pristine fused silica. Thus preferably the heat treatment occurs in the presence of oxygen.

The method of the present invention is not limited to any particular theory why the heat treatment works.

Once the optical fiber has been prepared, it can be bonded to a termination sleeve using conventional techniques. The terminated fiber can be connected to another fiber, a light source, a light detector, or other component. Thus, the term "connection" means attachment of a waveguide to any other element.

These and other features of the present invention will become better understood with reference to the following examples:

EXAMPLES 1A, 1B, 2A and 2B

Examples 1A, 1B, 2A and 2B show the inadequacy of the bond obtained when a waveguide core is bonded to a termination sleeve using conventional surface preparation techniques.

The waveguide tested comprised a fused silica (quartz) fiber core having an outer diameter of about 200 microns. Around the fiber was an inner optical cladding 38 microns thick, and an outer protective cladding of 49 microns thick. Both claddings were made of RTV polydimethyl siloxane. Both cladding layers were removed from a portion of the fiber core. The exposed fiber core surface portions for Examples 1A and 1B were cleaned with tetramethyl guanidine and for Examples 2A and 2B with J-100 stripping solution. Each fiber was then bonded to a termination sleeve made of polyvinylidene fluoride and then installed in a connector, Model No. 530954-5, available from AMP Incorporated of Harrisburg, Pennsylvania using an epoxy adhesive. For Examples 1A and 2A, the material on the interior of each termination sleeve which was bonded to the exposed surface portion of each fiber core was substantially uncrosslinked polyvinylidene fluoride. For Controls 1B and 2B, the same materials was used, in combination with N-[2-amino-ethyl]-3-aminopropyl trimethoxysilane which functions as a coupling agent at 0.3% by weight. After heating each termination sleeve during installation, the resulting assemblies were allowed to cool before being installed in AMP connectors. The strength of bonds between termination sleeves and fiber cores were tested in an Instron tester at a rate of pull of five millimeters per minute. The resulting bond strengths are presented in Table 1. In all four examples, the bond failed before the optical fiber broke.

EXAMPLES 3A and 3B

This test was conducted to show that the problem of inadequate bond strength is more of a problem with silicone cladding than with other types of cladding. In this test, the fiber core was a quartz fiber having a diameter of about 200 microns. The cladding was about 18 microns thick and made of Viton polymer from Dupont. The cladding was stripped from the fiber. No solvent and no heat were used to prepare the fiber for termination. Substantially uncrosslinked polyvinylidene fluoride, with and without a coupling agent, (Examples 3B and 3A respectively) were used to form the interior portions of respective termination sleeves. Each terminated waveguide was bonded into an AMP connector. The bonds were tested on the Instron tester using the same method used for Examples 1A, 1B, 2A and 2B. As reported in Table 1, each bond in Examples 3A and 3B did not fail, but rather failure was due to breakage of the waveguide fiber.

EXAMPLES 4A, 4B, 5A and 5B

The method of the present iinvention was used for these Examples, using lengths of the same waveguide used for Examples 1A, 1B, 2A and 2B. After the cladding was removed from an end portion of each fiber, the exposed surface portions of fiber cores 4A and 4B were treated with tetramethyl guanidine and the exposed surface portions of fiber cores 5A and 5B were subjected to pre-cleaning by exposure to a temperature in a radiant oven of about 315° C. for ten seconds. After fibers 5A and 5B were allowed to cool to room temperature, portions of somewhat embrittled silicone residue were stripped from the fiber cores with fingernails. Exposed surface portions of fiber cores 4A, 4B, 5A and 5B were then subjected to a hydrogen flame generated with a Henes water welder gas generator. The temperature of treatment was about 800° C. and the time of treatment was about 8 seconds. After the fiber cores had been allowed to cool to room temperature the exposed surface portions were wiped with isopropyl alcohol to remove any loose particles of oxidized silicone polymer. These four treated test fibers were then bonded into sleeves as reported in Table 1 and then the resulting assemblies were each bonded into an AMP connector like the ones used for the previous examples. It should be noted that when coupling agents are used bond strengths increase gradually after installation achieving a maximum value after a few days to about a week. All bond strength data reported in Table 1 was measured on bonds made at least 24 hours before testing. As can be seen from Table 1, the method of the present invention produced a substantially stronger bond than was obtained from the same fiber merely cleaned with solvent. Furthermore, the bond itself did not break, but rather the waveguide broke.

Although the present invention has been described in considerable detail with reference to certain versions thereof, other versions are possible. Therefore, the spirit and scope of the appended claims should not necessarily be limited to the description of the versions contained herein.

TABLE 1

| Test | Cladding Material | Surface Preparation | Inner Sleeve Material[2] | Bond Strength (kg) | Failure Mode |
|---|---|---|---|---|---|
| Example 1A | Silicone | Tetramethyl guanidine | Kynar 460[1] | .58 | Pull out |
| Example 1B | Silicone | Tetramethyl guanidine | Kynar 460 and coupling agent | .76 | Pull out |
| Example 2A | Silicone | J-100 | Kynar 460 | .56 | Pull out |
| Example 2B | Silicone | J-100 | Kynar 460 and coupling agent | .79 | Pull out |
| Example 3A | Viton | None | Kynar 460 | 1.16 | Waveguide broke |
| Example 3B | Viton | None | Kynar 460 and coupling agent | 1.16 | Waveguide broke |
| Example 4A | Silicone | Tetramethyl guanidine and hi-heat | Kynar 460 | .71 | Waveguide broke |
| Example 4B | Silicone | Tetramethyl guanidine & hi-heat | Kynar 460 and coupling agent | 1.6 | Waveguide broke |
| Example 5A | Silicone | Lo-heat pre-clean & hi-heat | Kynar 460 | .75 | Waveguide broke |
| Example 5B | Silicone | Lo-heat pre-clean & hi-heat | Kynar 460 and coupling agent | 1.4 | Waveguide broke |

[1]Substantially uncrosslinked polyvinylidene Fluoride from Pennwalt
[2]All termination sleeves tested possessed an outer heat-shrinkable sleeve made of crosslinked polyvinylidene fluoride (Kynar 460).

What is claimed is:

1. A method for preparing a polymeric clad fiber optic waveguide for bonding to a termination sleeve comprising the steps of removing cladding to expose a surface portion of the fiber core, the exposed portion having a polymeric residue thereon, and heating at least part of the exposed portion without the termination sleeve thereon to a sufficiently high temperature for a sufficient time so that a bond can be formed between the exposed fiber core and a termination sleeve substantially as strong as the bond that can be formed with a termination sleeve and a similar fiber core that has never been clad.

2. The method of claim 1 in which the fiber core is fused silica.

3. The method of claim 1 or 2 in which the cladding is silicone polymer.

4. The method of claim 3 in which the polymer is polydimethyl siloxane.

5. The method of claim 1 including the precleaning step of removing portions of said polymeric residue from the exposed fiber core before the step of heating.

6. The method of claim 5 wherein said precleaning step comprises removing portion of said residue with a solvent.

7. The method of claim 5 wherein said precleaning step comprises the steps of heating said residue on said exposed surface portion of said fiber core to a sufficiently high temperature for a sufficient time to cause said residue to become somewhat brittle; allowing said fiber core to cool to about room temperature; and mechanically stripping portions of the now embrittled residue from said exposed surface portion of said fiber core.

8. The method of claim 1 or 5 including, following the step of heating, the steps of allowing the fiber to cool to about room temperature; and wiping the exposed surface of said fiber core with a solvent to remove any loose particles of oxidized polymer residue.

9. The method of claim 1 in which the step of heating comprises heating the exposed portion so that it can form a bond with a termination sleeve sufficiently strong so that when the waveguide is pulled, the waveguide breaks 10. A method of preparing a silicone clad fiber waveguide for termination comprising the steps of:
 (a) removing a portion of the silicone cladding to expose a portion of the fiber core, thereby leaving a silicone residue thereon;

(b) removing a portion of the residue with a solvent; and thereafter (c) heating at least part of the exposed portion of the fiber core without any termination sleeve thereon to a sufficiently high temperature for sufficient time so that the exposed fiber core can form a bond with a termination sleeve so strong that when a pulling force is applied to the waveguide, the fiber core breaks before the bond fails, to step of heating not damaging the fiber core.

11. A method for preparing a polymeric clad fiber optic waveguide for bonding to a termination sleeve comprising the steps of:

(a) removing cladding to expose a surface portion of the fiber core, the exposed portion having a polymeric residue thereon;

(b) removing portions of said polymeric residue from the exposed fiber core with solvent;

(c) after removing portions of the polymeric residue with a solvent, heating at least part of the exposed portion without the termination sleeve thereon to a sufficiently high temperature for a sufficient time so that a bond can be formed between the exposed fiber core and a termination sleeve substantially as strong as the bond that can be formed with a termination sleeve and a similar fiber core that has never been clad;

(d) following the step of heating, allowing the fiber to cool to about room temperature; and (e) after allowing the fiber to cool to about room temperature, wiping the exposed portion of the fiber core with a solvent to remove any loose particles of oxidized polymer residue.

12. The method of claim 1, 10, or 11 in which the exposed fiber core is heated to a temperature of at least about 760° C.

13. The method of claim 1 or 12 in which the exposed fiber core is heated for at least about ten seconds.

14. The method of claim 1, 10, or 11 in which the exposed fiber core is heated for about 10 seconds.

15. A method for preparing a polymeric clad fiber optic waveguide for bonding to a termination sleeve comprising the steps of:

(a) removing cladding to expose a surface portion of the fiber core, the exposed portion having a polymeric residue thereon;

(b) removing portions of said polymeric residue from the exposed fiber core by the steps of:
 (1) heating said residue on said exposed surface portion of said fiber core without the termination sleeve thereon to a sufficiently high temperature for a sufficient time to cause said residue to become somewhat brittle;
 (2) allowing said fiber core to cool to about room temperature; and
 (3) mechanically stripping portions of the now embrittled residue from said exposed surface portion of said fiber core;

(c) after mechanically stripping, heating at least part of the exposed portion without the termination sleeve thereon to a sufficiently high temperature for a sufficient time so that a bond can be formed between the exposed fiber core and a termination sleeve substantially as strong as the bond that can be formed with a termination sleeve and a similar fiber core that has never been clad;

(d) after the heating of step (c), allowing the fiber to cool to about room temperature; and (e) after allowing the fiber to cool to about room temperature, wiping the exposed portion of said fiber core with a solvent to remove any loose particles of oxidized polymer residue.

16. The method of claim 1, 10, 11, or 15 including the step of protecting cladding not removed from the fiber core during the step of heating.

17. A method for preparing a fiber optic waveguide having a fused silica core and a silicone polymer cladding for bonding to a termination sleeve comprising the steps of removing cladding to expose a surface portion of the fiber core, the exposed portion having a polymeric residue thereon, and heating at least part of the exposed portion without the termination sleeve thereon to a sufficiently high temperature of at least about 760° C. for a sufficient time of about 10 seconds so that a bond can be formed between the exposed fiber core and a termination sleeve substantially as strong as the bond that can be formed with a termination sleeve and a similar fiber core that has never been clad, the method including the step of protecting cladding not removed from the fiber core during the step of heating.

18. The method of claim 1, 10, or 17 in which the heating occurs in the presence of oxygen.

* * * * *